Figure 5:
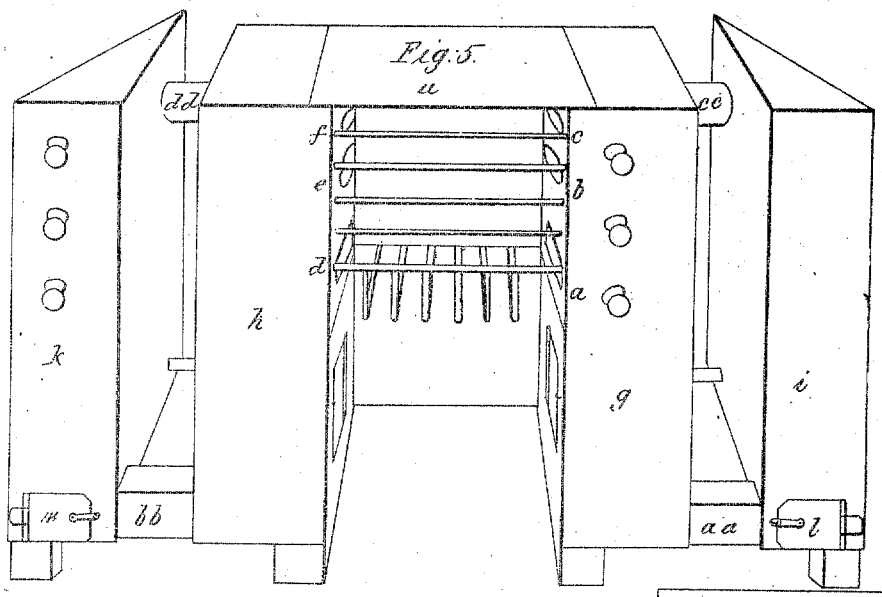

2 Sheets Sheet 1
7367X
J. Atwater,
Fire Place.
Patented Jan. 9. 1833.
Fig 8
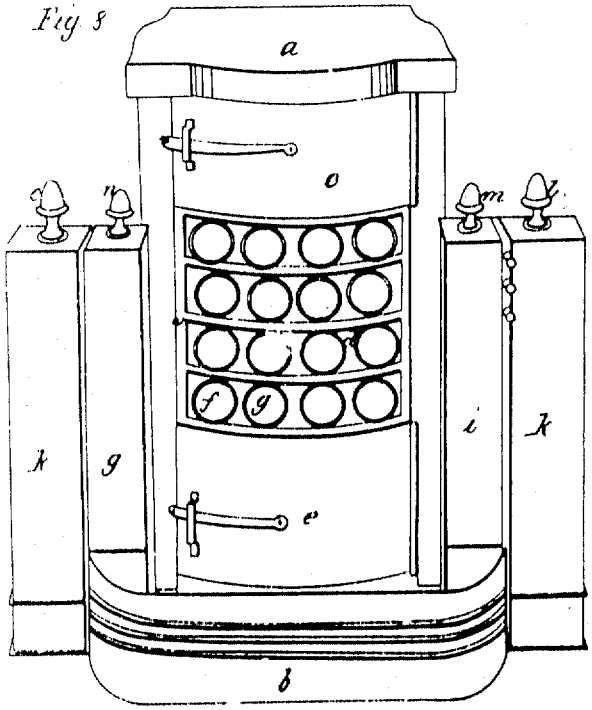
Fig. 3
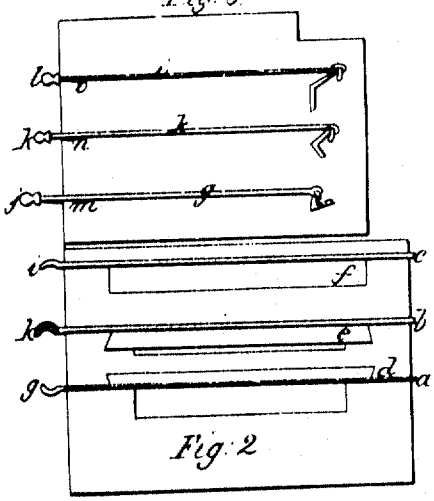
Fig. 2
Fig. 1
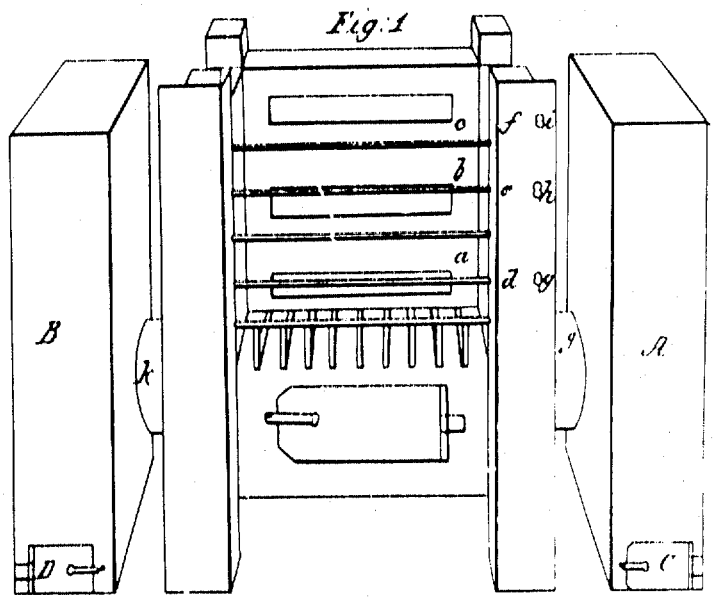
Fig. 4.
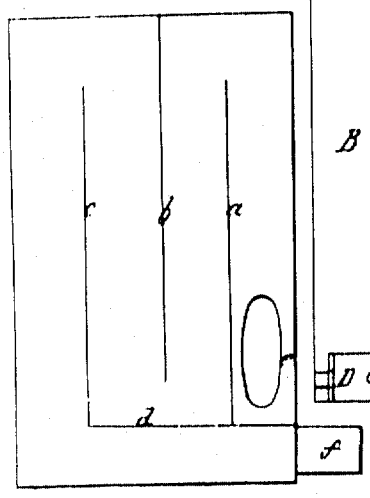

2. Sheets. Sheet. 2.

J. Stwater, 7,367 X

Fire Place.

Patented Jan. 9. 1837

7367X

James Atwater
Letters Patent

The Schedule referred to in these Letters Patent and making part of the same containing a description in the words of the said James Atwater himself of his improvement in the common Fire Grate.

---

To all people to whom these presents shall come greeting. Know ye that I James Atwater of New Haven in the County of New Haven State of Connecticut a Citizen of the United States have invented constructed & applied to use a new & useful improvement upon my patent Improvement in the common Fire Grate which new & useful improvement I describe & specify in manner following (viz.) This improvement consists in making alterations in my patent improvement in the common fire grate, for which I have obtained Letters Patent from the Government of the United States dated the 25th day of October one thousand eight hundred & thirty two & which is particularly described specified & set forth in the specification to said Letters Patent annexed and making part of the same. as the same are on record in the office of the Secretary of State of the United States according to the act of Congress in such case provided to which Letters Patent & specification on record as aforesaid express reference is hereby made, for a full description of said instrument or manufacture to which this present improvement is made by way of alteration or addition & which new & useful improvement addition or alteration for which this patent is solicited I further describe & specify as follows Construct my patent improved common Fire Grate according to my said specification in every respect except the following, that is to say, instead of the [illegible] or [illegible] slide or slides, balanced by weights & used to enlarge or any diminish or alter or close the openings which make the draughts or flues of the patent improved fire grate aforesaid & which are placed at the back thereof: make the back of the grate of solid materials such as soap stone or 7367x Jan. 9, 1833 or fire brick or iron with one or more openings in that part of the back which usually incloses the fuel which openings should slope upward & outwardly from the inside of the grate toward the chamber in the rear at about an angle of forty five degrees measured from the plane of the back of the grate & these openings should in their size correspond with and be proportioned to the size of the whole grate but should not in ordinary grates vary much from two inches in width & should be somewhat shorter than the width of the back of the grate measured from side to side & not more than three such openings will ordinarily be needed or found useful. And in order to regulate the draught of the grate at pleasure so as to extinguish the fire or cause it to burn with greater or less intensity construct a valve or moveable cover or stopper for each of the openings of some solid material which will bear a high degree of heat such as iron or some other metal & large enough fully to cover the opening or orifice to which it is to be applied, which valve, cover or stopper should be attached firmly to a rod or shaft supported by proper bearings at or near each end thereof which bearings may be placed in the back or sides of the grate so that the rod or shaft & the valve cover or stopper attached thereto will readily turn together & thus the valve cover or stopper will open or close the openings or draughts already mentioned in the back part of the grate separately or together at pleasure. The rod or shaft must be of solid materials such as will bear a good degree of heat such as iron or some other hard metal. Each rod or shaft & the valve, cover or stopper, attached to it may be turned by any means that are convenient. A useful mode of doing it will be to form a small crank at one end of each rod or shaft & attach one end of a wire or small rod to the crank at the end of each rod or shaft before described & bring the other end to the front part of the Grate & place a knob or other convenient handle to this other end so that when the valve cover or stopper closes its corresponding opening by its own weight then by pulling the wire or small rod each shaft or rod with its valve cover or stopper will be made to revolve & open the place, orifice or opening to which it is fitted, or when more convenient a knob or handle may be placed 7367x Jan. 9, 1833 placed at one end of each rod or shaft to which the valve cover or stop
per is attached & by this the same thing may be accomplished. The
end of the wire or small rod when such is used, is made to pass over
some bearing, & a small notch is made in the wire or small rod at such
a part thereof that when the opening is unclosed by pulling forward
the wire or small rod the notch may fall upon the bearing & hold
the valve cover or stopper firmly in its position. And if the knob or hand-
le is placed at the end of the rod or shaft. then a small hole is made
near the bearing of that end of the rod or shaft & a pin is placed as
to extend from the knob or handle toward the bearing & when the rod
or shaft with its valve cover or stopper is sufficiently turned to un-
close the corresponding opening then the rod or shaft may be pushed end
wise toward the grate so that the pin may enter the hole & hold the
rod or shaft with its valve cover or stopper fast in its position whene-
ver that may be according as it is more or less turned. The draw-
ings hereto annexed & herein referred to & which make a part of this
specification I describe as follows. Figure 1 is a front view of a
patent improved common fire grate with new improvements in
this instrument set forth. made with three openings in the back
marked a, b, c, & three knobs d, e, f, represented in their positions
when the opening a, b, c. are not closed. when the openings a. b. c. are
closed the knobs will be in the positions g, h, i,. The residue of the
figure represents two side chambers or air cells A.B. added to the
grate instead of pipes for the purpose of diffusing heat to the surrounding
air & other objects with two doors C.D. for the purpose of removing ashes
or dirt if necessary or of lessening the draught of the Grate. Figure 2.
exhibits the rods or shafts a, b, c, with the valves, covers or stoppers d, e,
f, in various positions & the crank g, h, i,. Figure 3. shows the small
rods or wires g, h, i, with the knobs j, k, l, at them & the notches
m, n, o, on the small rods or wires & these are represented in positions
corresponding with the positions of the valves covers or stoppers as seen in
Figure 2. Figure 4. shows the interior of the side chambers or air cells
which by means of the divisions a, b, c, d, cause the hot air & smoke ...

Figure 6:
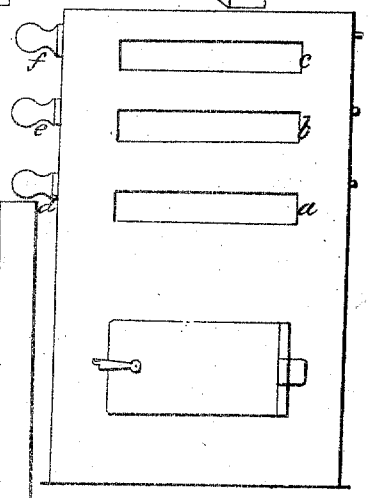
Figure 7:
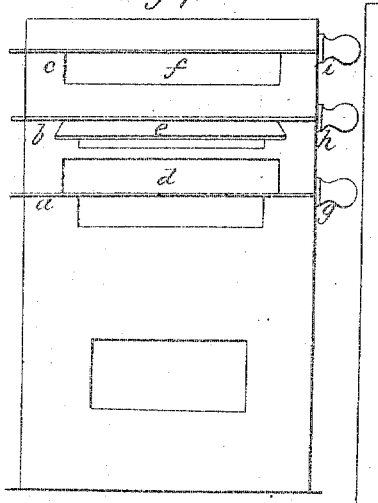
Figure 9:
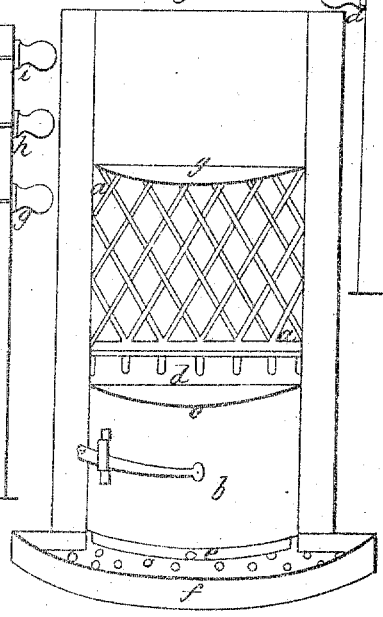

7367x Jan. 9, 1833 ceived at the opening a. which is connected with the chamber in the
grate as seen in Figure 1. j. k. to pass upwards over the partition a
& downwards under the partition b, & then upwards over the partition c. &
then downwards & under the partition d. & so off into the pipe f. which
is to be connected with a flue & carry off the smoke & air. Figure 5 is a
front view of an improved fire Grate with a double set of openings
a, b, c, d, e, f, placed in the sides of the grate & none at the back with
two chambers. g, h, at the sides of the grate for each of the sets of openings
& two air cells or chambers i, k, a little different in shape & without
internal divisions receiving the hot air & smoke at aa, bb, & passing
it off at cc, dd, & two doors in the same l, m, Figure 6 is an interior
or front view of one side of this grate with its openings a, b, c. and
the knobs d, e, f. Figure 7 is a back view of one side of this grate as
it would be seen if its chamber was removed with the rods or shafts
a, b, c. valves, covers, or stoppers d, e, f, & knobs g, h, i, in various
positions. Figure 8 is a front view of an improved fire grate which
differs from the grate represented in Figure 1. by the addition of a cov-
er a. at the top & a pan & fender b, at the bottom & three slightly
curved doors c, d, e, in front to close up the whole grate. The doors
c & e, may be made of sheet iron or tin or such like material.
The door d, is made of a frame of brass or polished iron or steel semi-
cilindrical bars made flat on the back side & a lining or frame of tin
or sheet iron made fast to the frame of the door which lining is per-
forated with the holes f. g. &c. which holes are filled with isinglass
to admit of the fire being seen while the air is excluded from passing.
The pilasters h, i, j, k, with the irons l, m, n, o, are added for
ornament. Figure 9. is a view of the same grate with the doors c
& d, as seen in Figure 8. removed in order to show the front of the
grate formed of iron lattice work a, a, and made flat or straight
from side to side of the grate so that the curve of the door Figure 8. d.
will keep the said door off from the front of the grate a, a. & so pre-
vent the bars of the door d, Figure 8. from being so much tarnished
by the heat. The lower door b. is made double curved in front & offset in the same as exhibited at the top of the same at c, d. & at the
bottom is placed a slide or stopper e. which when pushed back clo-
ses the space between the front & back of the door at the bottom & when
pulled forward opens the same. The use of this is to admit the air
which is to feed the fire to pass upward thro' the door & out at the
top between the front & back plates of the door at c d. & then pass
thro' the fuel & ignite the same. The pan f. is seen in this figure
which is hid by the fender b, in Figure 8. The grate in Figure 6.
is represented with a top n. & in Figure 8. with a top a & the
grate in Figure 1 may also be used with a top & in Figure 5 & in
Figure 1 with a pan or bottom when needed. These drawings exhib-
it the patent improved common fire grates as altered & claimed
in this patent in some of the various positions in which the same may
be conveniently used according to the fancy or taste of the owner
& so as to correspond with the furniture of the apartment in which
they are placed. In Figure 9. at g. is seen a piece of sheet iron or
other solid substance which in shape is a segment of a circle & is
used to prevent the air which comes in from below thro' the door
b, otherwise from ascending any higher than this part of the grate
& causes the air to pass thro' the fuel as before mentioned (whether
door c. as seen in Fig. 8 is closed or not) & the grate is filled with fuel.
I claim as my improvement that in the place of a slide or slides
grate or grates used in my patent improved common fire grate
to regulate the draught of the same. I have substituted as many valves
covers or stoppers as there may be openings in the back or sides
of the grate by means of which the draught is regulated at pleas-
ure or entirely closed in the manner set forth in this specification
& all the benefits which are set forth in my patent for my improved
common fire grate dated 25th October 1832. as resulting from the use of
slides or grates are thereby obtained in a more convenient manner
and this is all I claim in this patent. In testimony that the above
is a true specification of my said improvement as above described I have
hereunto set my hand the 17th day of December one thousand eight
hundred 7367x Jan. 9, 1833

[illegible]

[illegible] & Hinly [illegible]

Newspaper

Sam'l H. Hitchcock

Ebenezer Daly

[illegible]

James Atwater

2296 [illegible]

(Dr in portfolio)